United States Patent

Sorem

[15] 3,634,939
[45] Jan. 18, 1972

[54] SIGHTING ANGLE CALCULATOR

[72] Inventor: Herman Sorem, 5749 Dolphin Pl., La Jolla, Calif. 92037

[22] Filed: July 23, 1970

[21] Appl. No.: 57,609

[52] U.S. Cl. .............................. 33/1 SC, 235/61 NV, 35/44
[51] Int. Cl. .................................................. G01c 21/00
[58] Field of Search ...................... 33/1 R, 1 SC, 1 SD, 1 SB; 35/44; 235/61.02, 61 NV:89

[56] References Cited

UNITED STATES PATENTS

| | | | |
|---|---|---|---|
| 2,494,536 | 1/1950 | Atwood | 235/89 R |
| 3,127,811 | 4/1964 | Filangeri | 33/1 SD X |
| 3,133,352 | 5/1964 | Jasperson | 35/44 X |
| 3,535,790 | 10/1970 | Gray et al | 33/1 SC |

Primary Examiner—William D. Martin, Jr.
Attorney—R. S. Sciascia, G. J. Rubens and J. W. McLaren

[57] ABSTRACT

The spatial disposition of an object in orbit at a known height above the earth's surface is determined in terms of elevational and azimuthal angles relative to a known position on the earth's surface. A scalar representation of longitudinal versus latitudinal positions on the earth's surface relative to a great circle above which said object will be located is employed together with an overlay of a transparent graphical representation defining a plurality of first continuously linear loci each of the first loci representing the positions relative to said scalar representation and the disposition of said object above the great circle from which the object will have the same elevational angle. A plurality of second continuously linear loci is included on the transparent representation each of the second loci representing the position relative to the scalar representation and the disposition of the object above the great circle from which the object will have the same azimuthal angle.

9 Claims, 8 Drawing Figures

INVENTOR.
HERMAN SOREM

ATTORNEYS

INVENTOR.
HERMAN SOREM

SIGHTING ANGLE CALCULATOR

BACKGROUND OF THE INVENTION

Where a fixed site is involved with the acquisition of an object in orbit at a known height above the earth's surface, such as a satellite, for example, computations may be made in advance to be distributed to each such permanent or fixed site. For these computations Defense System's Communications satellites are usually printed on computer-lined output and may typically comprise 220 or more pages of 11 × 14 inch size. Customarily, such tables are issued each month and since each set of tables is peculiar to each site, they are distributed in advance to fill the need of various fixed-position terminals.

Where, however, it was not possible to use this type of tables because of a moving site, such as an aircraft, or ship at sea, a method of calculation was relied upon employing so-called ground trace tables which are calculated and distributed in advance. Unlike the link terminal acquisition tables described hereinbefore, the latter ground trace tables are more general in application in that one set of tables is useful at any site. Typically, these tables are issued monthly and comprise approximately 60 to 70 pages of a 10 × 14 inch size.

However, in the prior art practice they also inherently involved the use of two sizeable volumes published by the U.S. Naval Oceanographic Office titled "Sight Reduction Tables." The latter Sight Reduction Tables, together with the ground trace tables issued monthly provided sufficient tabular information to enable the employment of spherical trigonometric equations for the computation of the azimuth and elevational angles at which particular satellites might be acquired. However, because the site was not a permanent one, but rather moving or movable, these calculations could not be made in advance and were manifestly subject to a considerable element of possible human error in drawing upon the correct information from the tables and applying it in the proper manner mathematically to arrive at an accurate prediction of the azimuth and elevational angles at which the satellite might be acquired.

SUMMARY OF THE INVENTION

The present invention relates to a calculator employed for the computation of sighting angles from known earth locations to objects of known locations above the earth, such as, for example, a satellite orbiting in a great circle path which most commonly may be an equatorial circle, for example. The concept of the present invention employs a scalar representation of longitudinal versus latitudinal positions on the earth's surface relative to a great circle above which the object, such as a satellite, is known to be locatable. A transparent graphical representation is also employed as an overlay with scalar representation of longitudinal versus latitudinal positions. The transparent graphical representation defines a plurality of first continuously linear loci, each point on which first loci represents the positions relative to the scalar representation and the disposition of the object above the great circle from which that object, such as a satellite, for example, will have the same elevational angle. On the same transparent graphical representation a second plurality of second continuously linear loci is also included, each point of the second loci representing the positions relative to the scalar representation which it overlays and the disposition of the object above the great circle from which the object will have the same azimuthal angle.

The origin point of the loci is placed over the point on the scalar representation above which the object in orbit is known to be located at a particular time and the satellite paths of both the scalar representation of longitudinal versus latitudinal positions of the earth's surface, and the satellite path as represented on the transparent graphical representation are aligned. The sighting angles are then obtained in both azimuth and elevation by locating on the scalar representation of longitudinal versus latitudinal positions on the earth's surface, that particular point from which the object in orbit or satellite is to be sighted. The sighting angles are ascertained in both elevation and azimuth by reading from the loci lines on the transparent overlay which relate to azimuthal and elevational scales and interpolating between adjacent loci in both azimuth and elevational if that be necessary.

The invention as embodied in the foregoing description may be planar and comprise two sheets, the underlying sheet being opaque and taking the form of the scalar presentation of longitudinal versus latitudinal positions on the earth's surface, while the overlying sheet is the transparent graphical representation defining first and second continuously linear loci representing the positions relative to the scalar representation and the disposition of the object above the great circle from which the object will have the same elevational angle and azimuth angle, respectively.

This particular form of the present invention is most advantageous and convenient for the calculation for sighting angles from any position on the earth's surface relative to an equatorial satellite, for example. However, the concept of the present invention also contemplates a spherical form which may typically include a globe representing the earth's surface marked appropriately with longitudinal and latitudinal positions, together with a transparent overlay having first and second sets of loci as previously described, the transparent member preferably being hemispherical in shape and configuration. Still further forms of the present invention may be fabricated such as a planar circular form, for instance.

A preferred embodiment of the present invention which is particularly advantageous for use with equatorial satellites comprises a scalar representation of longitudinal versus latitudinal positions on the earth's surface in the form of a mercator projection and a single transparent overlay sheet having two sets, or families, of loci, one relating to azimuthal sighting angles and the other relating to elevational sighting angles. The transparent overlay sheet is so devised that it may be employed for the determination of sighting angles in any quadrant of the earth's surface. To effect this usage, the transparent overlay includes four sets of indicia relating to the same continuously linear loci, each set of indicia being so printed or inscribed that only one such set will be properly oriented for each quadrant reading. This is accomplished by inverting and reversing each set of indicia so that the transparent overlay must be reversed and/or inverted so that the proper quadrant indication will read correctly only when the overlay sheet is correctly oriented with respect to both reversal and inversion and as related to the scalar representation in the form of a mercator projection, for example, defining positions on the earth's surface in terms of latitude and longitude.

DESCRIPTION OF THE PREFERRED EMBODIMENTS

Figure 1:
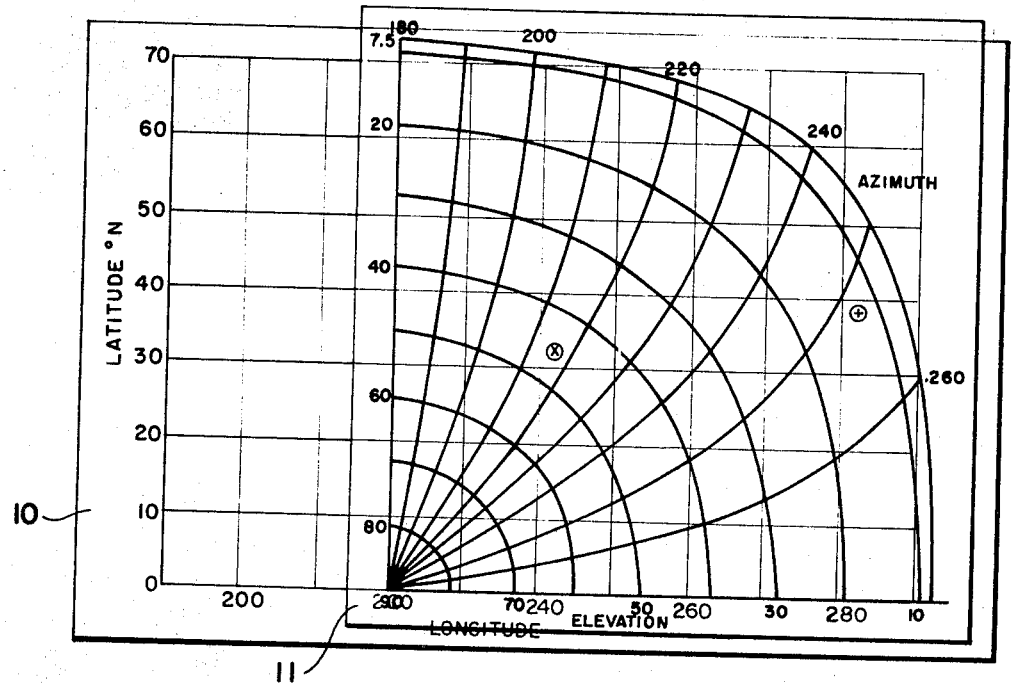
FIG. 1 is an illustration of a planar embodiment of the present invention.

FIG. 1 illustrates a form of the present invention which is particularly well adapted for the calculation of the elevational and azimuthal sighting angles of an orbiting object, such as a satellite which follows an equatorial path. The embodiment of FIG. 1 comprises a scalar representation of longitudinal versus latitudinal position on the earth's surface relative to a great circle in the form of a mercator projection as indicated by the numerical designation 10. Longitudinal degrees from 190° through 290° are shown along the abscissa, while latitudinal degrees zero through 70° are shown along the ordinate. The zero latitude, of course, represents the equator and it is to be understood that the scalar representation 10, as illustrated in FIG. 1, may be much larger to encompass a greater portion of the earth's surface.

Additionally, the scalar representation 10 may contain map information such as the outline of land mass areas, the location of oceans and other bodies of water, as well as known landmarks as may be desired. However, such additional information is not necessary to the concept and usage of the present invention but merely an aid which may be desirable in certain applications.

The second element of the embodiment of the invention shown in FIG. 1 is a transparent overlay 11 which has a plurality of first continuously linear loci each loci representative of the positions relative to the scalar representation 10 and the disposition of the orbiting object above the great circle from which the object will have the same elevational angle. Thus, the loci labeled 7.5, 20, 40, 60, and 80 on the ordinate scale of the transparent overlay 11 represent the elevational angle, while the intersecting family of loci designated 180, 200, 220, 240, and 260 are representative of the positions relative to the scalar representation 10 and the disposition of the object above the great circle, from which the object will have the same azimuthal angle.

In use, sighting angles may be obtained by ascertaining the position of an equatorial orbiting satellite above the earth's surface at a particular time. Such information may be readily obtained from the ground tables mentioned previously. With this initial knowledge, the origin of the two sets of loci as shown on the transparent overlay 11 is placed at the equatorial point in terms of longitudinal degrees over which the satellite will be at a particular time of day. The ordinate scale of the transparent overlay 11 is then aligned to be parallel with the ordinate scales of the mercator projection of longitudinal and latitudinal points on the earth's surface as shown in FIG. 1. Thus positioned, the latitudinal and longitudinal position of the site on the earth's surface from which the satellite is to be observed is determined relative to the latitudinal and longitudinal mercator projection of element 10. At this point through the overlay, both the elevational and azimuthal sighting angles are determined by referring the position of the site to both the elevational and azimuthal loci, respectively, portrayed on the transparent overlay 11. For purposes of illustrating and explaining the operational use of the embodiment of the present invention as shown in FIG. 1, it may be desirable to calculate and predict both the azimuthal and elevational angles at which an equatorial satellite will be sighted at a particular time of day and on a particular date from a ground site such as the Naval Electronics Laboratory Center at San Diego, California. The Naval Electronics Laboratory Center is located at 243° longitude east and 32° latitude north. This point is marked on the scalar representation 10 as shown by the ⊗.

It may then be determined from the appropriate ground trace table that a particular equatorial satellite will arrive at a point above the earth's surface designated as 220.5° east at 4 o'clock in the afternoon of a particular day. The origin of the transparent overlay containing two sets of loci related respectively, to azimuthal and elevational angles is placed at 220.5° longitude and 0° latitude which represents the equator, of course. The geographical location of the Naval Electronics Laboratory Center at San Diego, California as designated by the ⊗ on the scalar representation 10 is seen through the transparent overlay 11 and may be readily related to the azimuthal loci 210° and 220°, lying somewhat closer to the 220° azimuthal loci line as shown in FIG. 1. By visual interpolation it is apparent that the azimuthal sighting angle is approximately 217°.

In a similar manner, by reckoning the geographical position of the Naval Electronics Laboratory Center at San Diego, California as designated by the ⊗ relative to the elevational angles it may be seen that ⊗ lies between the 40° and the 50° loci of elevational angles and similar interpolation would approximate the elevational sighting angle as about 44°. Thus, it is quickly and conveniently determined that a particular satellite, when it arrives at a particular time of day at a point 220.5° east over the equator, will be seen at a sighting azimuthal angle of approximately 217° from the Naval Electronics Laboratory Center at San Diego, California and at the same time on the same date the same satellite will be sighted at an elevational angle of approximately 44° from the Naval Electronics Laboratory Center at San Diego, California.

An indication of the accuracy of the embodiment of FIG. 1 of the present invention may be had from the fact that actual spherical trigonometric calculation would result in predicted azimuthal and elevational angles, respectively, of 216.44° and 43.84°, indicating an error of about ½° for the azimuthal angle and considerably less than ½° for the elevational angle. Experience in predicting the sighting angles of orbiting objects has confirmed that approximations with about 1° are fully sufficient for sighting equipment, such as a shipboard satellite terminal, to readily pick up the object at the predicted angles. It will be appreciated, of course, that in inherent factor determinative of the allowable error which can be tolerated in the predicted sighting angles is the beam width and other operational characteristics of the apparatus which is employed for sighting the orbiting object.

As a second example, if it were desired, for instance, to calculate and predict the elevational and azimuthal sighting angles of the same satellite on the same time of day and date, but from the location of the Naval Research Laboratory in Washington, D.C., one would carry out the following sequence of operations. The location of the Naval Research Laboratory in Washington, D.C. would be established on the scalar representation of the mercator projection of element 10 by finding and marking the point at longitude 283° east and latitude 38° north. As shown in FIG. 1, the location of the Naval Research Laboratory at Washington, D.C. may be designated on the scalar representation on element 10 by a ⊕. Thus, the predicted and calculated elevational and azimuthal sighting angles from Naval Research Laboratory at Washington, D.C. would differ from those for the Naval Electronics Laboratory Center at San Diego, California. As may be seen from the illustration of FIG. 1, the calculated azimuthal angle for the Naval Research Laboratory at Washington, D.C. is predictable at approximately 252°, while its elevational angle is approximately 12°, as compared to the calculated sighting angles of 217° in azimuth and 44° in elevation for the Navel Electronics Laboratory Center at San Diego, California.

FIGS. 2a, 2b, 2c, and 2d illustrate a preferred embodiment of the present invention which incorporates the fundamental relationships of the transparent graphical representation element 11 of FIG. 1, having first and second families of loci representing azimuthal equiangular loci and elevational equiangular loci. The embodiment illustrated in 2a, 2b, 2c, and 2d is employed with the scalar representation of longitudinal versus latitudinal positions on the earth's surface as represented by element 10 by FIG. 1 in much the same manner as previously described.

However, by reference to FIG. 2a it will be seen that the designation of elevational angles is printed on the first line below the abscissa in correctly oriented fashion, while on the line immediately below the term ELEVATION, as well as the related numerals, are printed in a reversed sense. In a somewhat similar manner, the designation AZIMUTH is printed in both reversed and inverted fashion. The designations NORTH HEMISPHERE, SATELLITE WEST, SOUTH HEMISPHERE, SATELLITE EAST, NORTH HEMISPHERE, SATELLITE EAST, and SOUTH HEMISPHERE, SATELLITE WEST are also either reversed or inverted as shown in FIG. 2a.

Figure 2A:
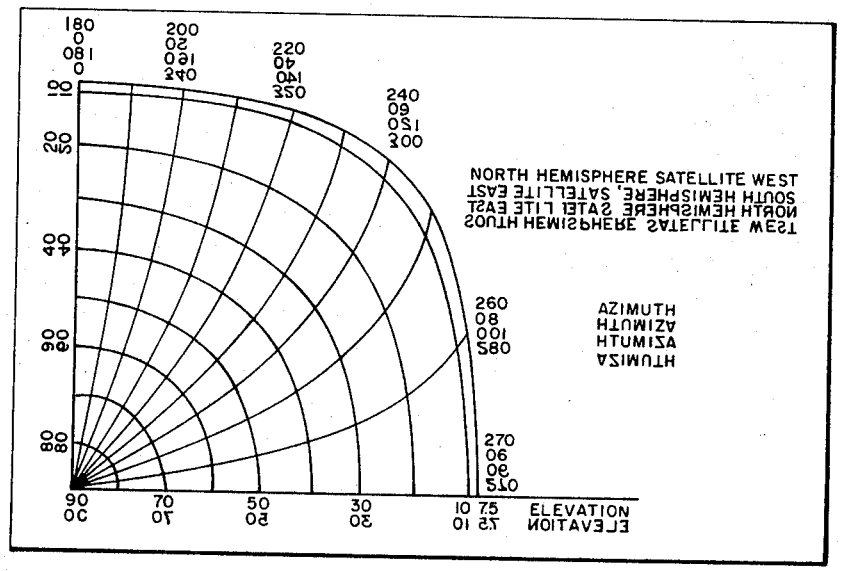
FIGS. 2a and 2b, 2c, and 2d illustrate a preferred planar embodiment of the present invention which may be used with any quadrant of the earth's surface by inversion and reversal of a single transparent overlay sheet.

It will be noted that FIG. 2a shows NORTH HEMISPHERE, SATELLITE EAST reading correctly, while SOUTH HEMISPHERE, SATELLITE EAST is upside down or inverted, NORTH HEMISPHERE, SATELLITE EAST is reversed in sense, and SOUTH HEMISPHERE, SATELLITE WEST is both reversed and inverted. This is also true of the related numerical designations so that in the designations in FIG. 2a of the numerals 270, 260, 250, 240, 230, 220, 210, 200, 190, and 180 read correctly while none of the other numerals are oriented properly with respect to the related NORTH HEMISPHERE, SATELLITE WEST relationship.

Figure 2B:
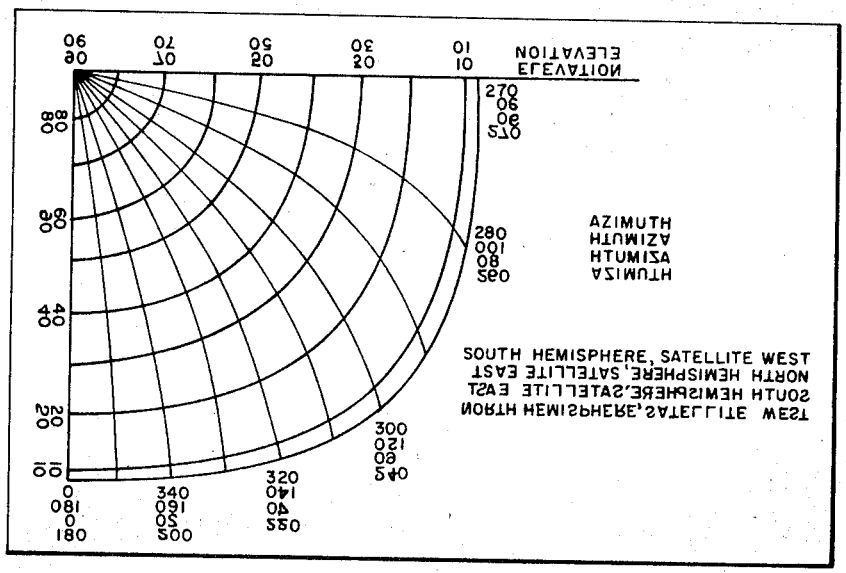

As a result of this unique arrangement, the same transparent overlay may be used to read any quadrant of the earth's surface as shown on a compatible mercator projection. In FIG. 2a the transparent overlay is oriented to predict the sighting angles from a point in the northern hemisphere where satellite is west. In the illustration of FIG. 2b, the identical transparent overlay is oriented so to properly predict and calculate the sighting angles of an orbiting satellite or object from a point in the south hemisphere with the satellite west. It will be noted that the concomitant numerical designations, for example, for azimuth reading from 270° to 0° or 360° are properly oriented to be read in the same relationship as the proper orientation of SOUTH HEMISPHERE, SATELLITE WEST.

Figure 2C:
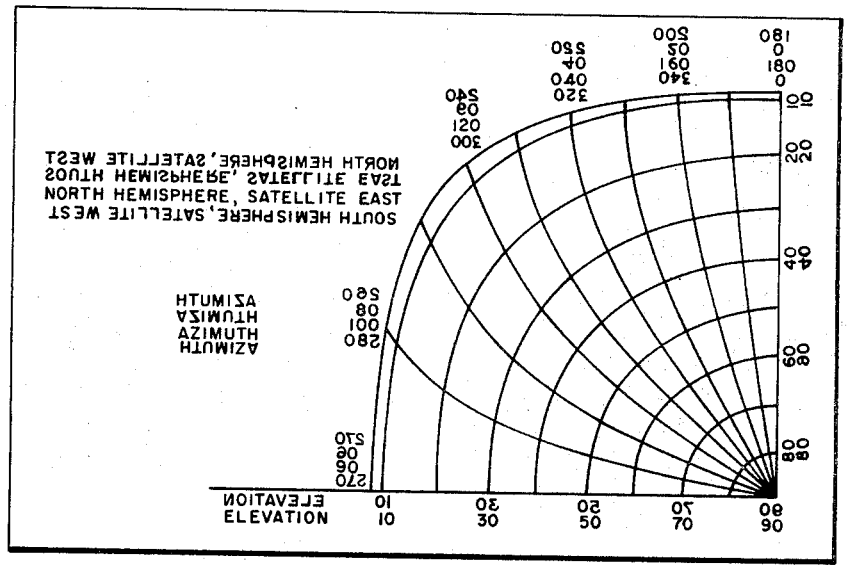
Figure 2D:
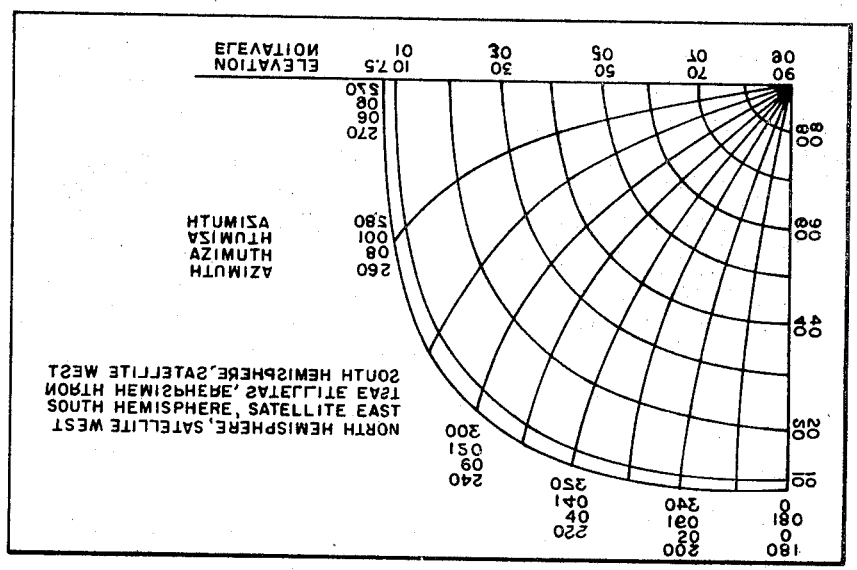

In a like manner, the illustration of FIG. 2c shows the same transparent overlay oriented so that NORTH HEMISPHERE, SATELLITE EAST reads properly and the work AZIMUTH is third from the top in that orientation, as are the related degree designations, third from the top of the four rows of numerals related to the azimuthal reading. In the same manner, FIG. 2d illustrates the identical transparent overlay so that SOUTH HEMISPHERE, SATELLITE EAST reads properly. The properly oriented designation, being third from the top correlates with the third numerical designation for each azimuthal reading as being third from the top of each such column of azimuthal degree readings.

Thus, it can readily be seen that the embodiment illustrated in FIGS. 2a, 2b, 2c, and 2d has an enhanced usefulness in that it is applicable to any quadrant of the earth's surface and moreover the transparent graphical representation includes four sets of numerical and polar indicia which are so arranged by inversion and reversal that only one such set will be properly oriented for such quadrant reading. The proper quadrant reading is, of course, that which is read right side up and from left to right.

Figure 3A:
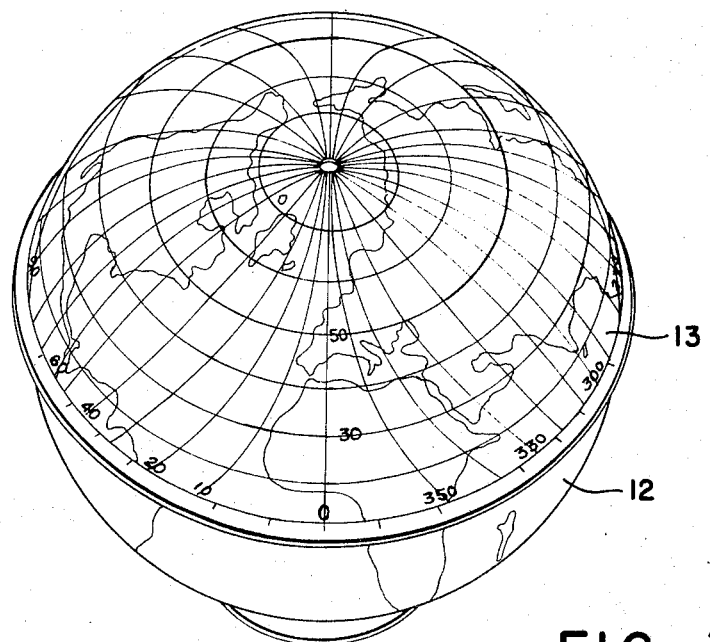
FIGS. 3a and 3b are illustrations of a spherically formed configuration of the present invention.
Figure 3B:
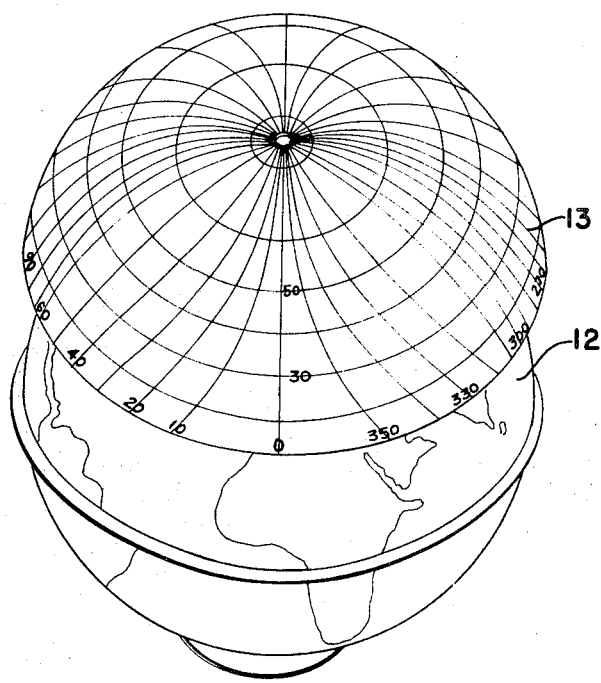

FIGS. 3a and 3b illustrate yet another form of the present invention which embodies a scalar representation of the earth's surface having longitudinal versus latitudinal indicia thereon as shown by the globe 12. A transparent graphical representation defining a first plurality of loci, generally shown as lines running from the polar region to the equatorial or great circle portion of the hemisphere 13, and elevational angles, generally shown as circular loci running around the hemisphere at different diameters. FIG. 3b shows the manner in which the transparent graphical representation embodying the linear loci held element 13 is removable and separable from the globular representation of longitude versus latitude positions on the earth's surface of element 12.

In its preferred form, the embodiment of FIGS. 3a and 3b is so configured that element 13 is in the form of the hemisphere and dimensioned so that its greatest dimension represents a great circle of the earth's surface, This great circle may be either an equatorial great circle, or such other great circle as may be followed by an orbital satellite. Accordingly, the embodiment illustrated in FIGS. 3a and 3b is useful not only to predict sighting angles of an orbiting satellite which is an equatorial path, but also the sighting angles of any other orbiting object which is following a great circle other than an equatorial pattern.

The manner in which such nonequatorial orbiting satellite may have its sighting angles predicted is as follows: the major diameter of the hemispherical number 13 is oriented to conform with the orbiting path of the satellite; then, by locating the sighting point on the earth's surface through the transparency of element 13, the sighting angles in terms of elevation and azimuth from that point to the satellite are determined by ensuring that the zero or 360° origin as shown on the great circle diameter of the hemisphere is placed over the point on the earth's surface above which the orbiting satellite will be at a particular time and date. The loci of azimuthal and elevational angles are then related to the established sighting point on the earth's surface and such interpolation as may be necessary is made, approximating both azimuthal and elevational sighting angles.

Figure 4:
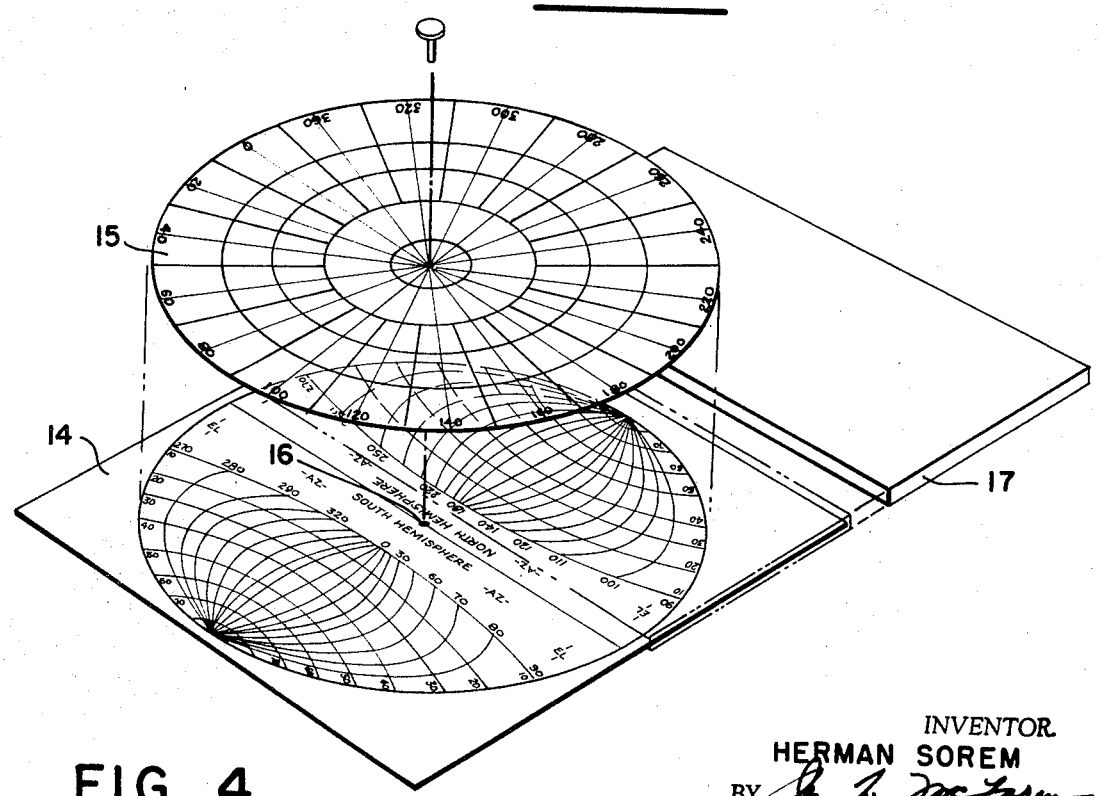
FIG. 4 is an illustration of a variant planar embodiment of the present invention.

It should be appreciated that other forms of the present invention are within the contemplation of its concept, such as, for example, is illustrated in FIG. 4. A planar circular form 14 in which one-half of the earth's surface is shown as a circular projection. The loci or readout are presented on a transparent overlay 15 so that the overlay 15 may be revolved about a point 16 on the great circle established by the satellite's orbit. The sighting location is determined on the scalar representation in terms of longitudinal versus latitudinal position on one-half of the earth's surface, and the azimuthal and elevational sighting angles, read in a manner commensurate with that previously described in connection with the embodiments of FIGS. 1, and 2a–2d. An opaque envelope 17 may be employed to cover either the Northern Hemisphere or the Southern Hemisphere portion of the circular projection as desired to ensure that correct readings are made.

Generically, the manner of operation and use of variant embodiments of the present invention is substantially and essentially the same in principle as previously related and taught in relation to the use and operation of the illustrated embodiments. It has been convincingly demonstrated by actual use that the concept of the present invention, especially when embodied in the planar form as illustrated in FIG. 1 or FIGS. 2a through 2d, may be used by relatively unskilled persons after a minumum time of instruction and experience. Moreover, the use of the present invention, since it eliminates the use of tables and the requirement for personnel to look up various data from such tables, avoids a great source of possible human error. A concomitant advantage which is most significant from the point of view of elimination of possible sources of human error as well as being a substantial time saving, is that the use of the present invention obviates the requirement for spherical trigonometric calculations.

Obviously, many modifications and variations of the present invention are possible in the light of the above teachings. It is therefore to be understood that within the scope of the appended claims the invention may be practiced otherwise than as specifically described.

What is claimed is:

1. An apparatus for determining spatial disposition of an object in orbit at a known height above the earth's surface in terms of elevational and azimuthal angles relative to a known position on the earth's surface comprising;
   a scalar representation of longitudinal versus latitudinal positions on the earth's surface relative to a great circle above which said object will be located,
   a transparent graphical representation defining a plurality of first continuously linear loci, each said first loci representing the positions, relative to said scalar representation and the disposition of said object above said great circle, from which said object will have the same elevational angle,
   a plurality of second continuously linear loci on said transparent representation, each said second loci representing the positions, relative to said scalar representation and the disposition of said object above said great circle, from which said object will have the same azimuthal angle,
   whereby the origin point of said loci may be placed over the longitudinal point on said scalar representation above which said object is known to be located for determining the elevational and azimuthal angles of said object relative to any longitudinally and latitudinally locatable point on said scalar representation.

2. An apparatus as claimed in claim 1 in which said scalar representation and said transparent graphical representation are spherically shaped.

3. An apparatus as claimed in claim 1 in which said transparent graphical representation is hemispherical and its largest circumference represents said great circle.

4. An apparatus as claimed in claim 1 wherein said transparent graphical representation is adapted to be selectively positioned relative to said scalar representation.

5. An apparatus as claimed in claim 1 in which said scalar representation and said transparent graphical representation are planar.

6. An apparatus as claimed in claim 5 in which said scalar representation is a projection of the earth onto the plane defined by the satellite's orbit.

7. An apparatus as claimed in claim 5 in which said scalar representation is a mercator projection.

8. An apparatus as claimed in claim 7 in which said transparent graphical representation comprises a quadrant of the earth's surface.

9. An apparatus as claimed in claim 8 in which said transparent graphical representation includes four sets of numerical and polar indicia inverted and reversed so that only one such set will be properly oriented for each quadrant reading.

* * * * *